(12) United States Patent
Olmsted et al.

(10) Patent No.: US 11,512,929 B2
(45) Date of Patent: *Nov. 29, 2022

(54) COMPACT DYNAMIC HEAD UP DISPLAY

(71) Applicant: LMD Applied Science, LLC, Rochester, NY (US)

(72) Inventors: Brian L. Olmsted, Spencerport, NY (US); Jeffrey W. Mock, Rochester, NY (US)

(73) Assignee: LMD Applied Science, LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,489

(22) Filed: Sep. 17, 2021

(65) Prior Publication Data

US 2022/0074706 A1 Mar. 10, 2022

Related U.S. Application Data

(63) Continuation of application No. 16/895,171, filed on Jun. 8, 2020, now Pat. No. 11,125,532, which is a (Continued)

(51) Int. Cl.
*F41G 1/30* (2006.01)
*G02B 23/14* (2006.01)
(Continued)

(52) U.S. Cl.
CPC ............... *F41G 1/30* (2013.01); *F41G 1/35* (2013.01); *G02B 1/11* (2013.01); *G02B 23/14* (2013.01);
(Continued)

(58) Field of Classification Search
CPC . F41G 1/30; F41G 1/35; F41G 11/003; G02B 27/0189; G02B 23/14;
(Continued)

(56) References Cited

U.S. PATENT DOCUMENTS 6,899,539 B1 5/2005 Stallman et al.
10,267,597 B2 * 4/2019 Olmsted ............ G02B 27/0101
(Continued)

OTHER PUBLICATIONS

Office Action for U.S. Appl. No. 16/895,171, dated Aug. 25, 2020, Olmstead, "Compact Dynamic Head up Display", 4 Pages.

*Primary Examiner* — Andrew Sasinowski
(74) *Attorney, Agent, or Firm* — Lee & Hayes, P.C.

(57) ABSTRACT

Head up displays are provided. A head up display may have a base adapted for mounting to a firearm; a window positioned by the base so that a user of the firearm can observe a field of view through the window; an illuminator operable to generate a divergent illumination light; a light valve configured to modulate the divergent illumination light in accordance with an image provided by an image generator; and a collimating optic in an optical path between the light valve and the window that substantially collimates the image modulated illumination light. The window reflects at least a portion of the image modulated collimated light so that the observer observes the image substantially in focus with objects in field of view. Images presented may include data and images, including but not limited to thermal images.

20 Claims, 12 Drawing Sheets

Related U.S. Application Data continuation of application No. 16/390,532, filed on Apr. 22, 2019, now Pat. No. 10,677,562, which is a continuation of application No. 15/411,632, filed on Jan. 20, 2017, now Pat. No. 10,267,597.

(60) Provisional application No. 62/281,591, filed on Jan. 21, 2016.

(51) Int. Cl.
    *G02B 27/01* (2006.01)
    *F41G 1/35* (2006.01)
    *G02B 1/11* (2015.01)
    *H04N 5/33* (2006.01)
    *F41G 11/00* (2006.01)

(52) U.S. Cl.
CPC ..... G02B 27/0101 (2013.01); G02B 27/0189 (2013.01); H04N 5/33 (2013.01); *F41G 11/003* (2013.01); *G02B 2027/014* (2013.01); *G02B 2027/0138* (2013.01); *G02B 2027/0141* (2013.01)

(58) Field of Classification Search
CPC ............... G02B 27/0101; G02B 1/11; G02B 2027/0138; G02B 2027/014; G02B 2027/0141; H04N 5/33
See application file for complete search history.

(56) References Cited

U.S. PATENT DOCUMENTS

| | | |
|---|---|---|
| 2005/0057808 A1 | 3/2005 | Houde-Walter |
| 2006/0162226 A1 | 7/2006 | Tai |
| 2012/0106170 A1 | 5/2012 | Matthews et al. |
| 2013/0283660 A1 | 10/2013 | Matthews et al. |
| 2013/0333266 A1 | 12/2013 | Gose et al. |
| 2020/0049453 A1 | 2/2020 | Olmsted et al. |
| 2020/0370866 A1 | 11/2020 | Olmsted et al. |

\* cited by examiner

COMPACT DYNAMIC HEAD UP DISPLAY

CROSS REFERENCE TO RELATED APPLICATIONS

This application is a continuation of and claims priority to U.S. patent application Ser. No. 16/895,171, filed Jun. 8, 2020, now U.S. Pat. No. 11,125,532, issued Sep. 21, 2021, which is a continuation of and claims priority to U.S. patent application Ser. No. 16/390,532, filed Apr. 22, 2019, now U.S. Pat. No. 10,677,562, issued Jun. 9, 2020, which is a continuation of U.S. application Ser. No. 15/411,632, filed Jan. 20, 2017, now U.S. Pat. No. 10,267,597, issued Apr. 23, 2019, which claims the benefit of U.S. Provisional Application No. 62/281,591, filed Jan. 21, 2016. The entire disclosures of each of the above applications are incorporated herein by reference.

STATEMENT REGARDING FEDERALLY SPONSORED RESEARCH OR DEVELOPMENT

Not Applicable.

FIELD OF THE INVENTION

Target identification, detection, tracking, and aiming systems and more particularly those that utilize dynamic image information such as thermal images.

DESCRIPTION OF RELATED ART

Head up display devices provide unique advantages to a user of a firearm or to other persons using a display to observe a visual field. A primary advantage is that the user may obtain information from the display without necessarily limiting the users visual field as is done when a scope is used. For this reason so-called holographic sights have become increasingly popular over the past 20 years. There are several types of sights used with small arms, such as rifles, shotguns, handguns, bows and other similar hand held weapons including sights which incorporate holographic images of various one, two and three dimensional reticle patterns. Prior devices incorporating holograms are shown in U.S. Pat. Nos. 5,483,362; 4,643,515; 5,151,800; 5,815,936; and 6,490,060. However, such devices do not provide variable information.

One effort to meet this need can be found in the Steiner Optics, Intelligent Combat Sight, (ICS), this device integrates 6× scope, a laser rangefinder and a ballistic calculator into a rugged, compact tactical weapons sight and provides digital displays that block out portions of the scene visible through the scope. For close quarters battle this system provides a rail mounting to which a head up display can be attached.

What is needed therefore is a head up display that can present variable information such as map or GPS coordinates, compass headings, messages, distances to target, rounds fired, rounds remaining, and any other information that may be useful to a user of such a device that is compact, lightweight, and that can be cooperatively engaged with firearms. Of particular interest is the use of such a head up display system to present thermal image information about the scene.

A variety of devices have endeavored to meet such needs through the use of virtual displays. For example the T10-S, T10-N and T10-M thermal imagers sold by Torrey Pines Logic, LLC, provide a weapon mountable head up displays with a thermal imager that presents a virtual image of a scene. It will be appreciated that such systems cannot be effectively used with other visible light imaging optics such as 4× optical imagers because such systems would merely be imaging the virtual display and providing magnified images of individual picture elements of the display to the extent that such optics are even operable to form an image of a portion of a virtual screen that is so close to such magnifiers. Further, the image resolution of many thermal imagers is particularly low and optical magnification of a portion of this imager would crop out much of the scene information with little benefit.

However, devices that present only virtual images to a user can have can delays and important scene information can be lost through resolution differences, color interpretations, the smaller dynamic range of electronic imagers and displays, processing errors and the like. Accordingly, being wholly dependent upon virtual displays when using firearms may not be preferable in many situations.

It is known to provide variable information in head up displays. For example, commonly assigned U.S. Pat. No. 7,069,685 describes and claims, for example, a compact head up display for a firearm with a base cooperatively engaging the firearm; a diffractive optic mounted to the base, a coherent illuminating beam source for illuminating the diffractive optic, a power source selectively connected to the coherent illuminating beam source a light valve optically intermediate the diffractive optic and the coherent illuminating beam source; and an image generator connected to the light valve for creating an image on the light valve. Further, commonly assigned. U.S. Pat. No. 7,455,860 describes and claims, for example, a method of sighting a firearm, comprising illuminating with a coherent illuminating beam a diffractive optic mounted to the firearm, the illuminating beam including data-comprising a dynamic image originating at a light valve optically upstream of the diffractive optic, wherein the diffractive optic is a hologram having a recorded image of an infinitely spaced focal plane. Additionally, commonly assigned U.S. Pat. No. 7,721,481 describes and claims, for example, a compact head up display for a firearm, comprising abase cooperatively engaging the firearm; a hologram mounted to the base, the hologram having a recorded image of an infinitely spaced focal plane; a light source optically upstream of the hologram; a light valve optically intermediate the hologram and the light source; and a night vision system operably connected to the light valve.

These approaches are technically sound, commercially valuable and useful. However, different approaches may be useful in meeting specific needs.

BRIEF SUMMARY OF THE INVENTION

Head up displays are provided. In one aspect, a head up display has a base adapted for mounting to a firearm; a window positioned by the base so that a user of the firearm can observe a field of view through the window; an illuminator operable to generate a divergent illumination light; a light valve configured to modulate the divergent illumination light in accordance with an image provided by an image generator; and a collimating optic in an optical path between the light valve and the window that substantially collimates the image modulated illumination light. The window reflects at least a portion of the image modulated collimated light so that the observer observes the image substantially in focus

DETAILED DESCRIPTION OF THE DRAWINGS

Figure 1:
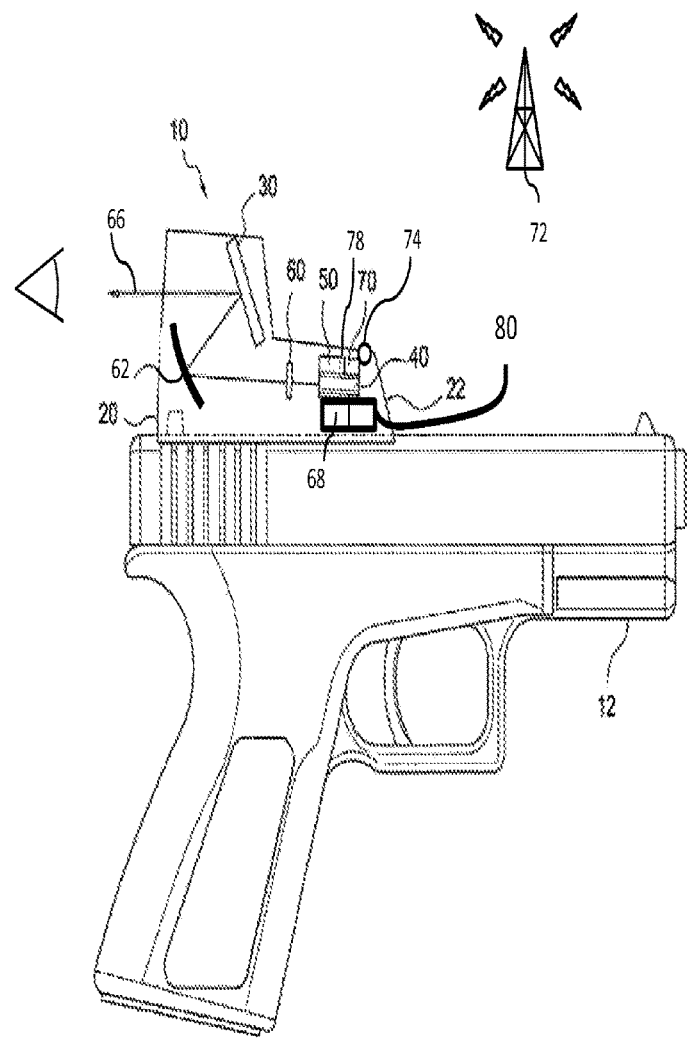
FIG. 1 is a side elevational view of a head up display on a firearm.

Referring to FIG. 1, a compact head up display 10 for a firearm 12 is shown. Head up display 10 can be cooperatively mounted to any of a variety of handheld, side and small arms such as pistols, rifles, shotguns, automatic, semi-automatic arms, as well as bows, collectively referred to as firearms. It will be appreciated however that in certain embodiments head up display 10 may be used for other purposes.

The head up display 10 includes a base 20, a window 30 connected to the base, an illuminator 40, a power source 50 for powering the powered components of the head up display, a light valve 60, a collimating optic 62 and an image generator 70 operatively connected to the light valve 60.

Referring to FIGS. 1-4, base 20 can be any of a variety of configurations that cooperatively engage the firearm 12. Base 20 can include any of a variety of clamping or mounting mechanisms such as a Weaver style, Picatinny mount or dove tail engagement. It is also understood base 20 can include a cover or shroud or housing 22 to encase or substantially encase or house the remaining components of head up display 10.

Base 20 is constructed to operatively retain window 30, illuminator 40, power source 50, light valve 60 and image generator 70 relative to firearm 12. However, it is understood that aspects of head up display 10 can be integrated into firearm 12. For example, power source 50 and/or image generator 70 can be retained or housed in firearm 12.

Window 30 is connected to base 20. Although window 30 is shown as fixedly connected to base 20 it is understood window 30 can be moveably connected to base 20 between an operable position and a closed (or transport) position. In the fixed or operable position, the window 30 is disposed and is sufficiently transparent so that an operator of the firearm 12 can sight through window 30.

In the embodiment that is illustrated, window 30 has no optical power and is not of a focusing type. In either the permanent or the moveable mounting of window 30, it is understood window 30 can be mounted to allow adjustment around one, two or three mutually perpendicular axes. Thus, an alignment of window 30 can be performed to accommodate variations or tolerances in components, as well as wear. In embodiments, window 30 may be generally flat as illustrated or may take other forms such as the form of a prism. Window 30 could include a partially silvered window, or could have an anti-reflective coating on one or more surfaces. In embodiments window 30 can have an non-perfect anti-reflective coating on the surface against which collimated image modulated light from a light valve 60 can be projected with residual reflection providing sufficient reflection to allow a user to observe the collimated light.

In the embodiment illustrated, a collimating optic 62 is positioned to collimate image modulated light passing to window 30 from light valve 60 to provide an image plane of the image modulated light at infinity to a viewer observing a scene through window 30. However, it is understood the image plane can be located adjacent to an eye of the user (intermediate the firearm and the user) or anywhere from the firearm to infinity. Thus, the image plane can be located from adjacent to the user to infinity.

Illuminator 40 is connected to the base for projecting an illuminating beam through the light valve 60 to intersect the window 30. Illuminator 40 can directly illuminate the light valve 60 as shown or can illuminate the light valve through a light diffuser.

In the embodiment shown in FIG. 1, image modulated light from light valve 60 passes directly to collimating optic 62 and reflects in a collimated manner onto window 30. In one configuration, the imaged modulated light intersects window 30 at an inclined angle. That is, a principal ray 66 of the image modulated light is inclined relative to the normal of the window 30.

It will be appreciated that this arrangement allows a user observing a scene through window 30 to observe a scene through window 30 while simultaneously observing virtual information contained in the image modulated collimated light reflecting from window 30. Importantly, this can occur irrespective of the actual focus distance required to see the scene in focus and without requiring the use of a powered or diffractive optic in the path between the scene and an eye of the user. Additionally, the use of a generally optically non-powered window 30 may reduce the complexity, cost or temperature sensitivity of the head up display and may enable a wide range of wavelengths of light to be presented to the user.

In one configuration, illuminator 40 takes the form of a laser that produces a diverging coherent beam. A preferred laser is a laser diode such as HL6321 MG manufactured by Hitachi. However, illuminator 40 need not be a laser. In other embodiments illuminator 40 can take the form of a Light Emitting Diode (LED), Organic Light Emitting Diode (OLED), Electroluminescent Material (ELM), a quantum dot emitter or any other form of electrically powered light. Illuminator 40 can emit white or nearly white light, or colored light, and can include one or more than one emitter and where more than one emitter is used the emitters can be of different colors. The light generated by illuminator 40 can be heavily saturated or can be comprise well mixed combinations of light or combinations therebetween.

In one configuration, power source 50 includes at least one battery. Depending upon the anticipated power requirements, available space and weight restrictions, the batteries can be N-type batteries or AA or AAA batteries. It is understood that any type of power source, preferably portable and small in size can be utilized. The battery type power source can be disposable or rechargeable.

In one configuration, base 20 includes a battery compartment sized to operably retain the batteries when subject to the recoil that can be experienced in a high caliber firearm. The battery compartment can be formed of a weather resistant, resilient material such as plastic and shaped to include receptacles for receiving the battery(ies) required for power. Further, the battery compartment be selectively closeable or sealable to prevent environmental migration into the compartment.

Alternatively, firearm 12 can incorporate the power source 50, including any associated batteries. In this configuration, base 20 includes a pair of electrical contacts or pads for providing electrical communication between the head up display 10 and firearm 12.

Light valve 60 is connected to base 20 and disposed optically intermediate illuminator 40 and window 30. Light valve 60 is selected such that upon illumination by illuminator 40, image modulated light passes through and is partially reflected by window 30 (or intermediate optics or subsequent projection onto window 30). Light valve 60 can be any of a variety of devices including liquid crystal displays or field emission displays. In one configuration, light valve 60 is a transmissive element, such as a liquid crystal display (LCD) however in other embodiments, light valve 60 may take other forms such as an emissive display formed using for example Organic Light Emitting Diodes or quantum dot technologies. In general any form of display capable of presenting variable information can be used.

Image generator 70 is operably connected to the light valve 60 to cause an image to be formed on the light valve 60. Image generator 70 can be any of a variety of mechanisms such as an integrated circuit or a computer chip. Image generator 70 can include a plurality of stored images that can be selected by the user in response to changing needs of the user. For example, different reticle images can be stored in the image generator 70. In one configuration, image generator 70 includes a user interface 74 for controlling image generator 70 and selecting the image to be formed in light valve 60. In other configurations, user interface 74 may be remote from head up display 10. Image generator 70 can be powered by power source 50. An image generator 70 such as is found in a reflective or transmissive LCD manufactured (or sold) by Kopin Corporation may be satisfactory. Light valve 60 may take the form of a reflective or transmissive light valve and where a reflective light valve is used the light valve may also be used to perform the functions ascribed to any of the mirrors described herein.

In a further configuration, it is contemplated image generator 70 can include a video driver 78 for providing moving images to light valve 60. Image generator 70 can also optionally include reticles and range finding information.

Image generator 70 may incorporate drivers that can be used to control the light emitted by individual picture elements of light valve 60 and may include other components such as a general purpose processor or controller that can analyze image information and generate images that are modified in accordance with the image information.

In a further configuration, image generator 70 cooperates with a source of image information 80 for providing images representative of conditions in a field of view to light valve 60 and hence the window 30. In embodiments, the output from source of image information 80 can be directly connected to the light valve 60, or passed through the image generator 70.

In embodiments source of image information 80 includes an infrared sensitive imager such as a near infra-red, short wave infrared, mid-wave infrared and long wave infrared imager. So called night vision systems and image intensifiers can be used as can imagers for sensing other wavelengths of light such as ultra-violet imagers. Such sources of scene information can be active or passive. The source of scene image information can be coupled or connected head up display such as being joined thereto by way housing 22 or other components joined to housing such as by being joined to a firearm or other structure to which housing 22 is joined. This allows the operator to sight in both visible and invisible wavelengths of light without looking through cumbersome goggles, monoculars or binoculars. Satisfactory sources of image information 80 include FLIR Systems, Inc., Wilsonville, Oreg., USA, Seek Thermal, Inc., Santa Barbara, Calif., USA, and ITT Corporation, White Plains, N.Y., USA.

In a further configuration, the head up display 10 can include a receiver 68 or transceiver for receiving information from a remote source. Such information can include targeting information, as well as strategic and tactical information, health and safety information, instructions, and image information thereby allowing silent coordinated operations. As the images in the head up display are dynamic, the communication with remote sources 72 allows coordination between a plurality of head up displays.

Thus, in an alternative configuration, source of image information 80 can be separate from the firearm 12 and head up display 10 and can have data provided via telemetry to the head up display 10. The head up display 10 can include a receiver 68 (or transceiver) selected to acquire the data from source of image information 80.

Although light valve 60 and the image generator 70 are described as separate elements, it is contemplated these elements can be incorporated or integrated into a single unitary structure, without departing from the present invention.

Figure 2:
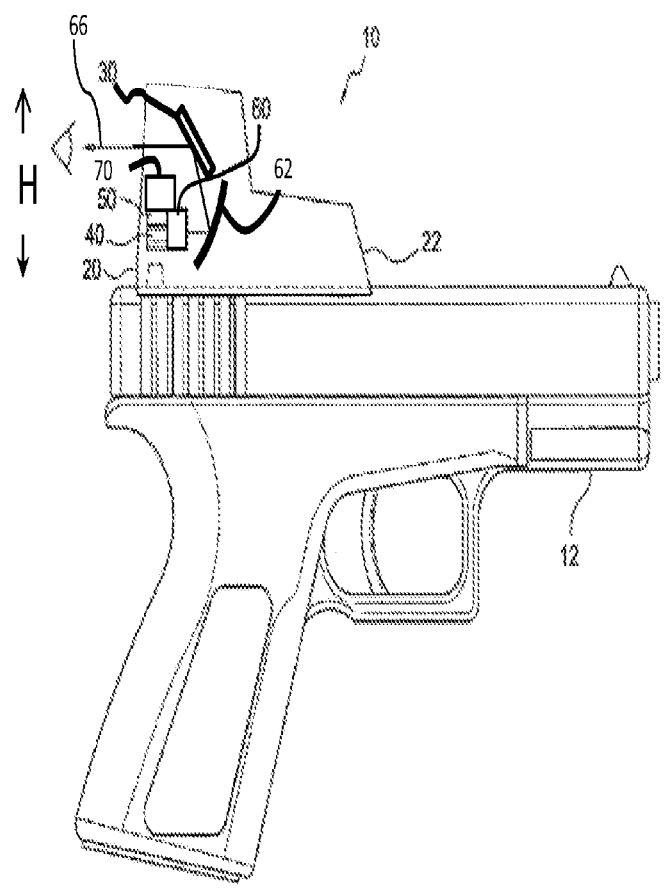
FIG. 2 is a side elevational view of a firearm incorporating a window.

FIG. 2 shows another embodiment of the head up display with a different orientation of collimating optic 62, an illuminator 40 and light valve 60. It will be appreciated that this orientation can be more compact as compared to the embodiment of FIG. 1. In particular, this embodiment can be used to provide a head up display 10 that is to fit within a certain preferred range of heights H relative to a mounting structure of firearm 12. This preferred range of heights H can be based in part upon predicted eye positioning. The preferred range of heights H may also be determined based upon the need to align the images visible at window 30 with other optical systems such as magnifiers, or to avoid blocking iron sights.

Operation

In operation, the image generator 70 cooperates with the light valve 60 to form an image in light valve 60. Illuminator 40 is powered by power source 50 to create a diverging illuminating beam, wherein at least a portion of the illuminating beam passes through light valve 60 and onto collimating optic 62 which collimates the image modulated light. Window 30 reflects the illuminating image modulated light to display the image, such that the viewer looking through window 30 sees the display of the image. In the embodiment of FIGS. 1 and 2 image modulated light from light valve 60 is illustrated as being both reflected and collimated by collimating optic 62 which may for example and without limitation be shaped as illustrated in the form of an off-axis parabola or a segment of a parabola.

Figure 3:
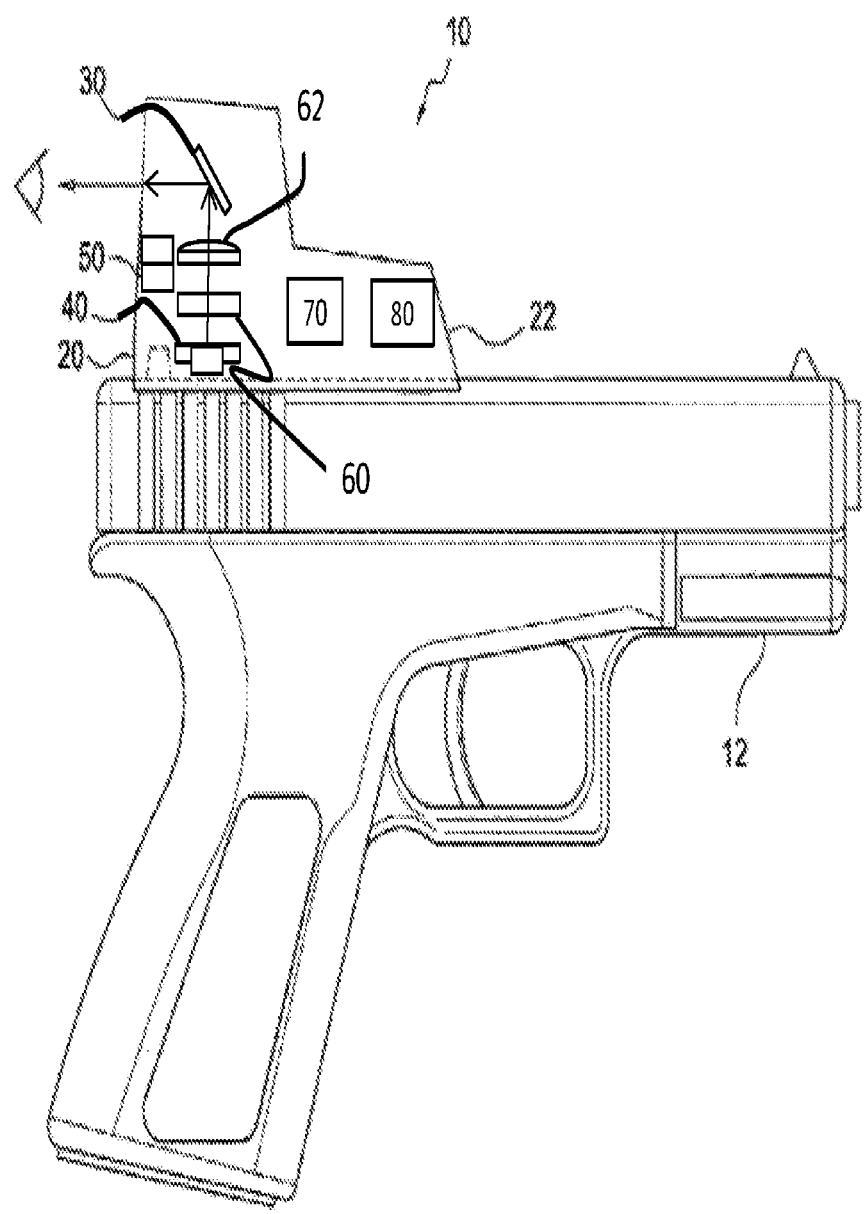
FIG. 3 is a side elevational view of a firearm incorporating an alternative design of the head up display.

FIG. 3 illustrates yet another embodiment of head up display 10. In this embodiment, illuminator 40 and light valve 60 are arranged in a vertical dimension and project through a transmissive collimating optic 62 onto window 30. In this embodiment a refractive transmissive collimating optic 62 is illustrated. However a diffractive transmissive collimating optic 62 can be used in place of collimating optic 62. Additionally, diffractive and transmissive refractive optics may be used in combination to perform the function of a collimating optic.

Figure 4:
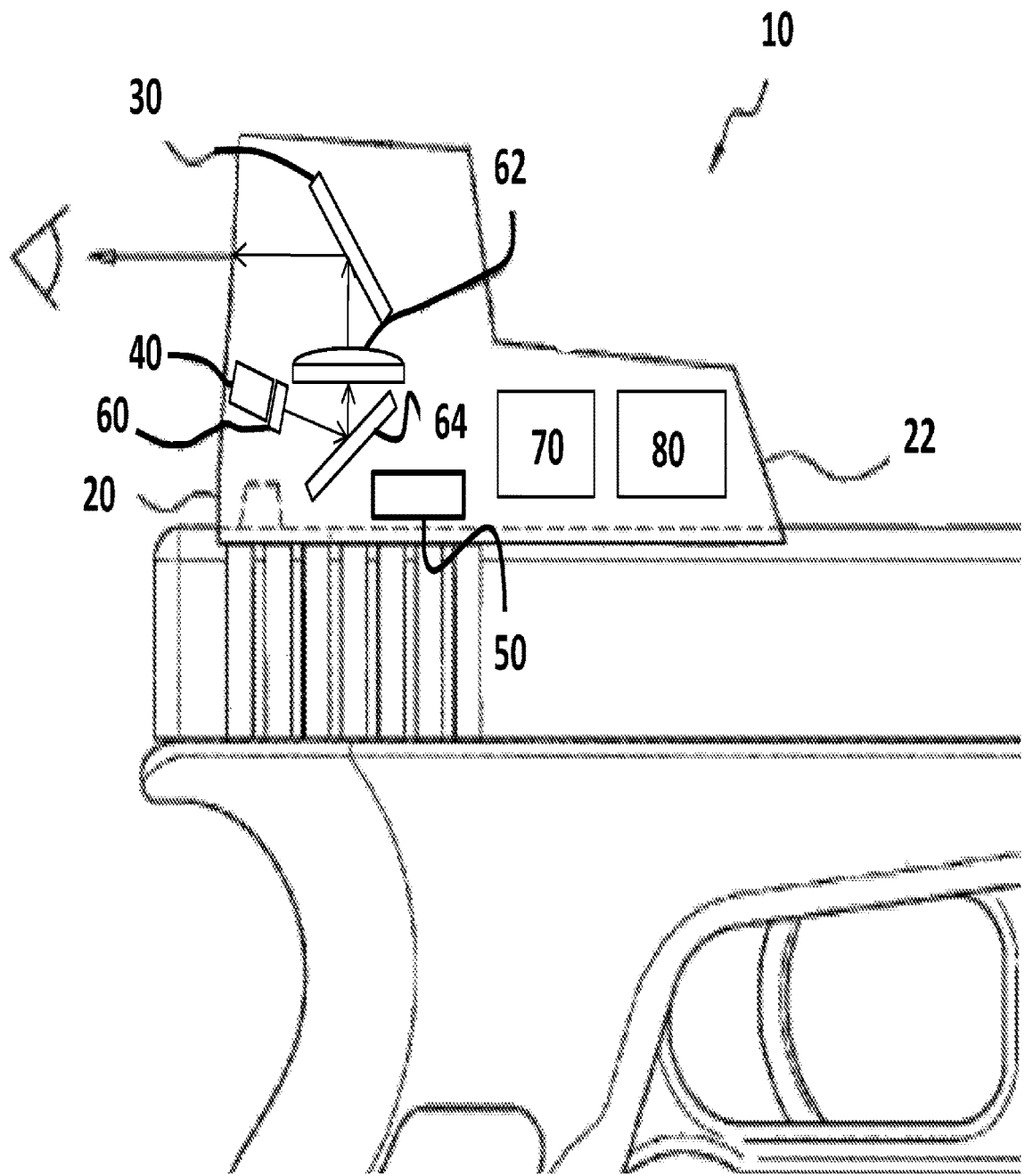
FIG. 4 is a perspective view of a firearm incorporating the head up display, with selected components of the head up display shown schematically.
Figure 5:
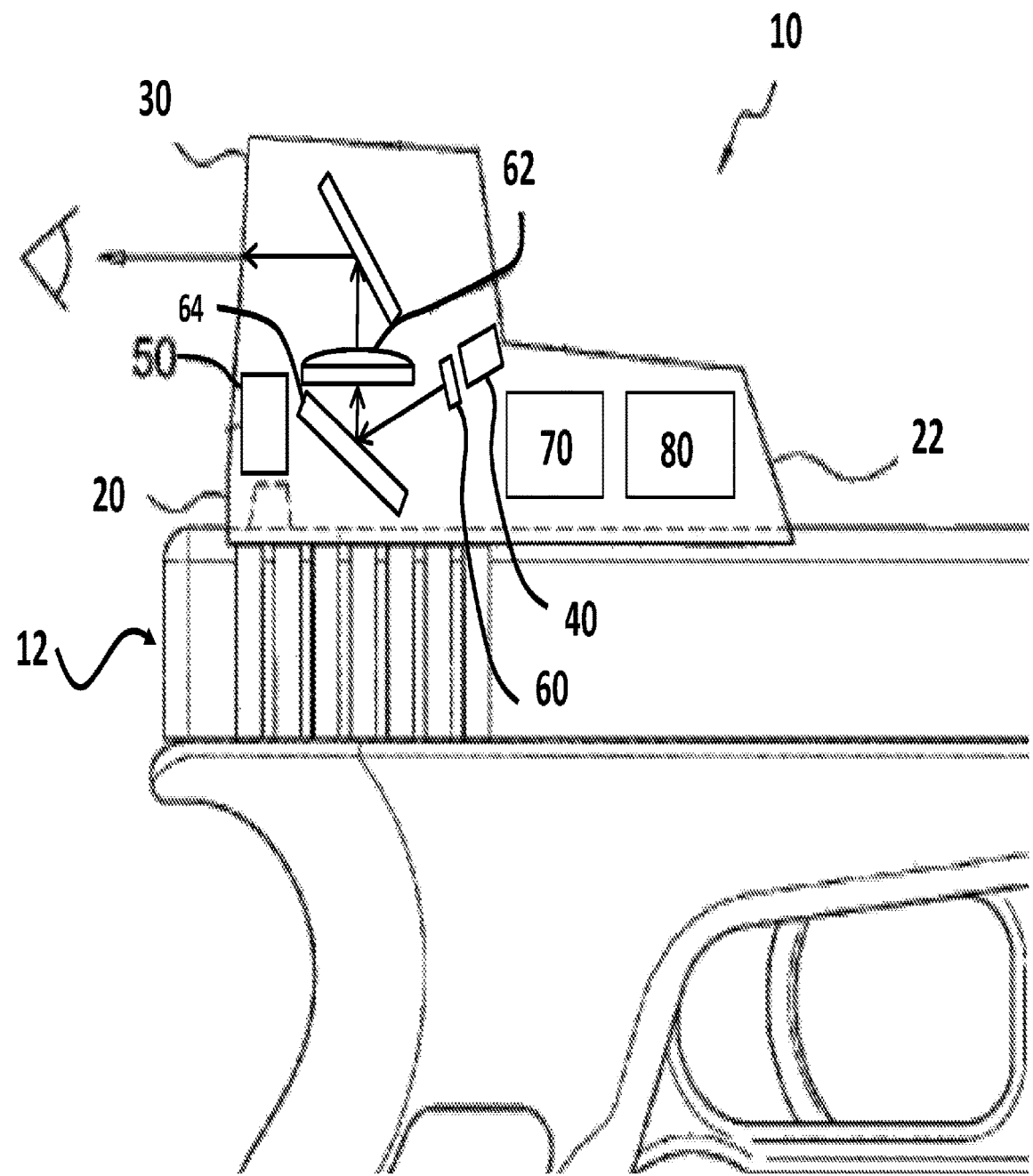
FIG. 5 illustrates yet another configuration of head up display with a turning mirror.

FIG. 4 illustrates a further embodiment of head up display 10. In this embodiment illuminator 40 and light valve 60 are configured to project image modulated light onto a turning mirror 64. Turning mirror 64 in turn directs the image modulated light through collimating optic 62 onto window 30. This configuration allows reduced vertical height of head up display 10. FIG. 5 illustrates yet another configuration of head up display 10 with a turning mirror 64.

Figure 6:
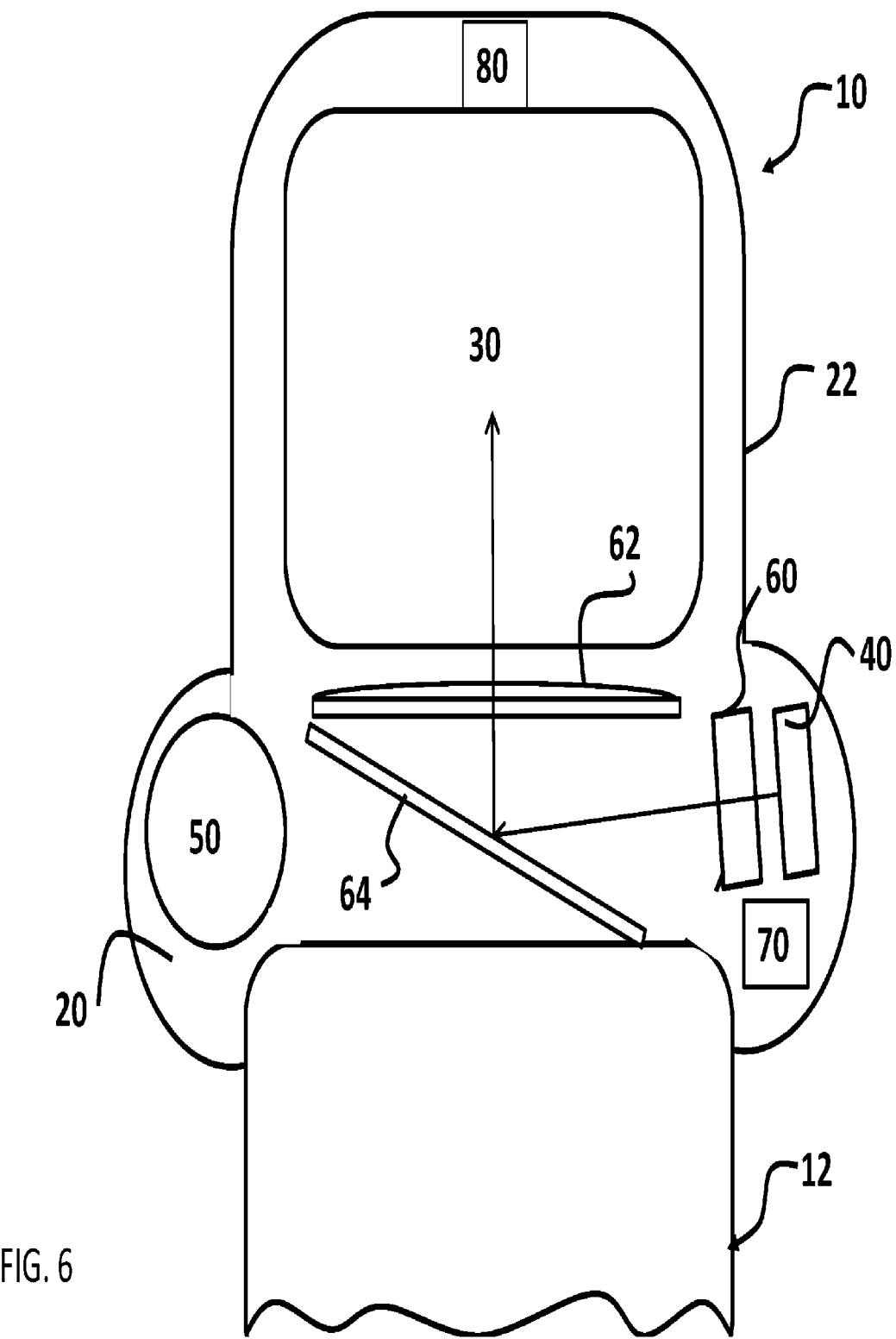
FIG. 6 illustrates a schematic view of a rear view of a head up display and firearm with further a turning mirror.

FIG. 6 illustrates a schematic view of a rear view of a head up display 10 and firearm 12 with further a turning mirror 64. In this embodiment illuminator 40 and optionally light valve 60 are arranged at least in part to the side of head up display 10 and optionally firearm 12. Power source 50 is shown also being positioned optionally to the side of head up display 10 and firearm 12. This configuration may achieve reductions in a height of display 10. Also shown in this embodiment is an alternative location source of image information 80.

In the configuration of head up display 10 employing image generator 70, moving images or varying images can be generated in the light valve 60 and thus "displayed" through reflections at window 30. Thus, a wide variety of information including but not limited to range finding information, scene image information and any other data or visual information can be readily displayed without requiring the user to move their head.

A user interface 74 can be provided that allows a user to make adjustments to intensity of the illumination of the light valve 60 or adjust the range of contrast of light valve 60 so that both light from the scene and light projected onto window 30 can be viewed accurately and without interference during operation. In embodiments with a source of image information 80 having a scene imager, the scene imager may be capable of sensing ambient light conditions and image generator 70 may be capable of making automatic adjustments. In further embodiments separate scene brightness sensors may be used to provide signals to image generator 70 from which image generator 70 may make automatic adjustments.

Where range finding information is desired, a rangefinding laser may be supplied to direct a laser beam toward an object in the field of view and a sensor may be provided to sense a return of light from the laser beam. Image generator 70 or a dedicated range finding processor may use the sensed light to determine a range. In a further configuration, the laser beam can be split between an illuminating beam and a targeting beam. That is, the targeting beam is reflected from the firearm to intersect the target, while the illuminating beam passes through the light valve and onto the window.

It is also contemplated that a range finder module can be incorporated into the head up display 10. Commercially available range finders can be integrated into cover 22, such that the output of the range finder is input into image generator 70 or light valve 60. Thus, head up display can also provide range information to the user.

Of particular interest is the use of head up display 10 to provide image information sensed in the field of view of the head up display in wavelengths of light that are not visible. Such image information enhances information visible through window 30 to better enable a user to identify targets and to separate targets from non-targets.

Figure 7:
FIG. 7 illustrates one example of a field of view as viewed through the head up display.
Figure 8:
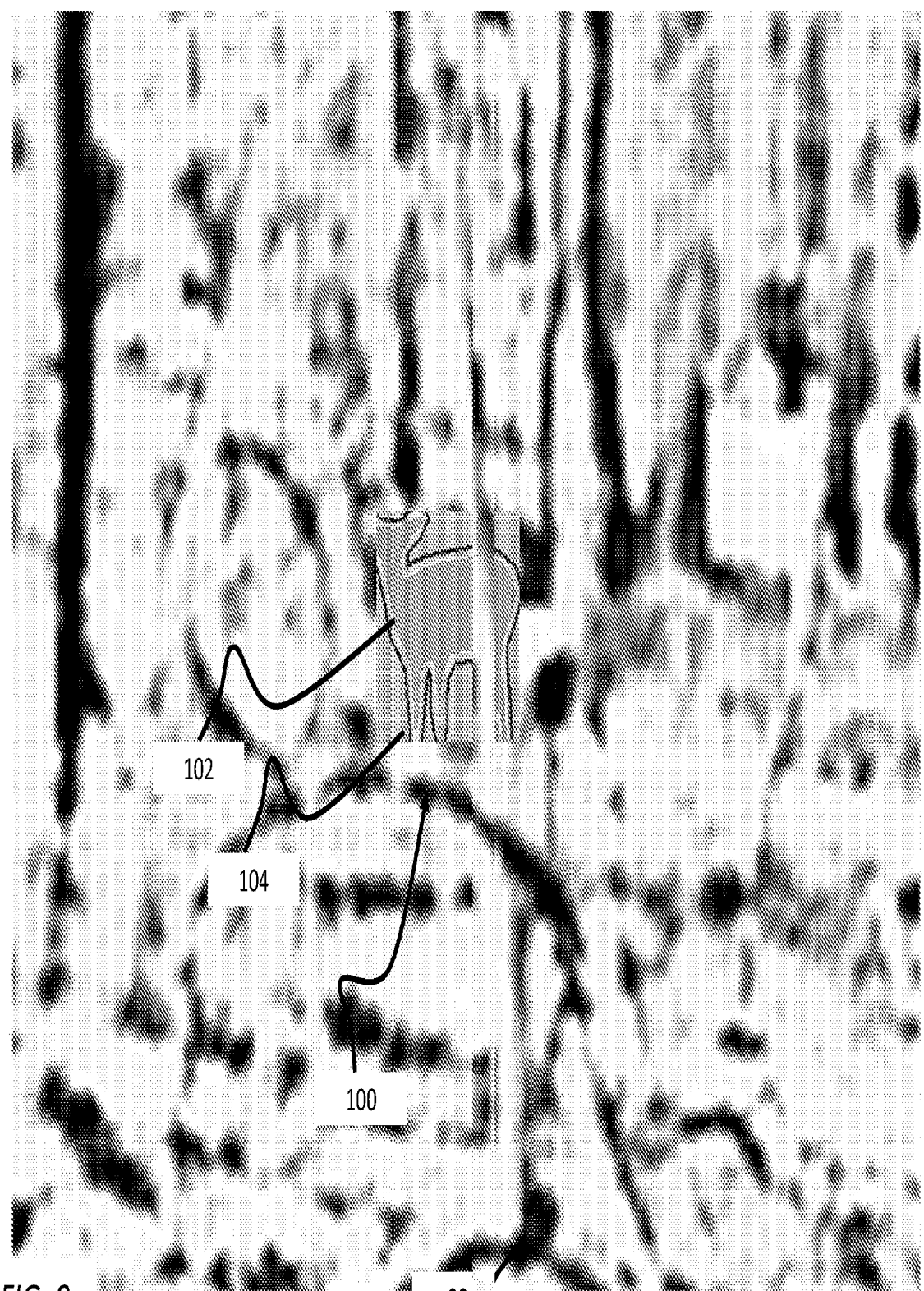
FIG. 8 illustrates an example of what may be observed by a user of head up display when head up display includes an image source with a long wave imager.

FIG. 7 illustrates one example of a visual field of view 98 in which targets may be found but that are difficult to see in visible light under the conditions simulated. This image is illustrative of the challenges associated with identifying targets in complex terrain and with lighting challenges. FIG. 8 illustrates an example of what may be observed by a user of head up display 10 when head up display 10 includes a source of image information 80 with for example a long wave imager. Here source of image information 80 senses heat from a target that is partially concealed by brush and highlights this by projecting a heat image 100 onto window 30 from which a user can better identify the source of the heat and discriminate it from surrounding vegetation. Such a heat image 100 can include image information from all portions of the scene or image information from particular segments. The heat image 100 can be discriminated from adjacent natural light scene content through the use of colors, outlining, text, markings or other visual indicia indicative of the presence of an object that is emitting more heat or otherwise markedly thermally different from adjacent scene content. Flashing, strobing or other animations of such highlighting or outlining or any other types of heat image 100 may be used. In one embodiment such a heat image or parts thereof may be strobed at a rate of between 2 and 10 Hz. As is illustrated in heat image 100, a hot object may be designated by a highlight 102 or an outline 104 for example.

Figure 9:
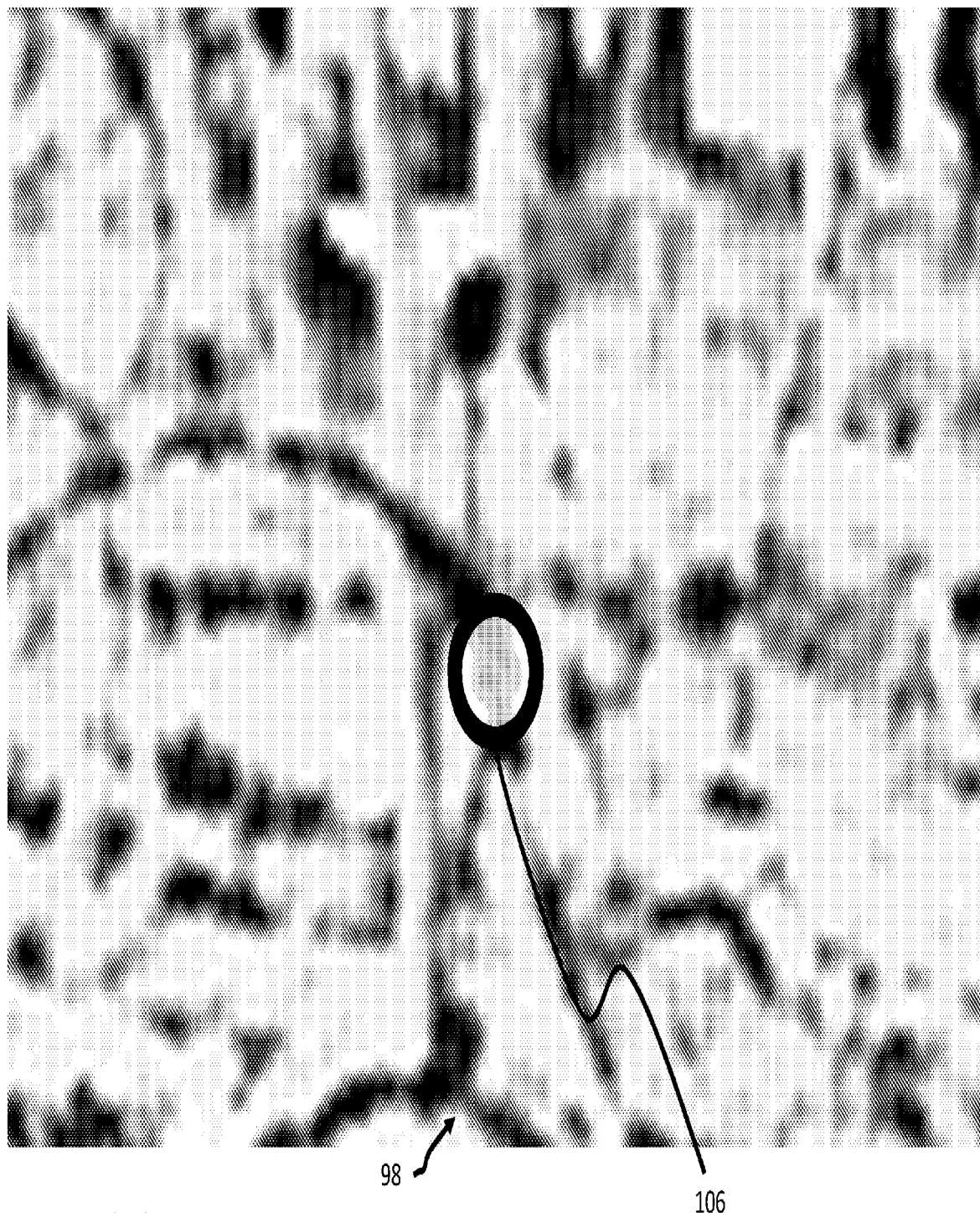
FIG. 9 illustrate another example in which an aiming reticle changes to indicate when the user is aiming at a cool or ambient target area.
Figure 10:
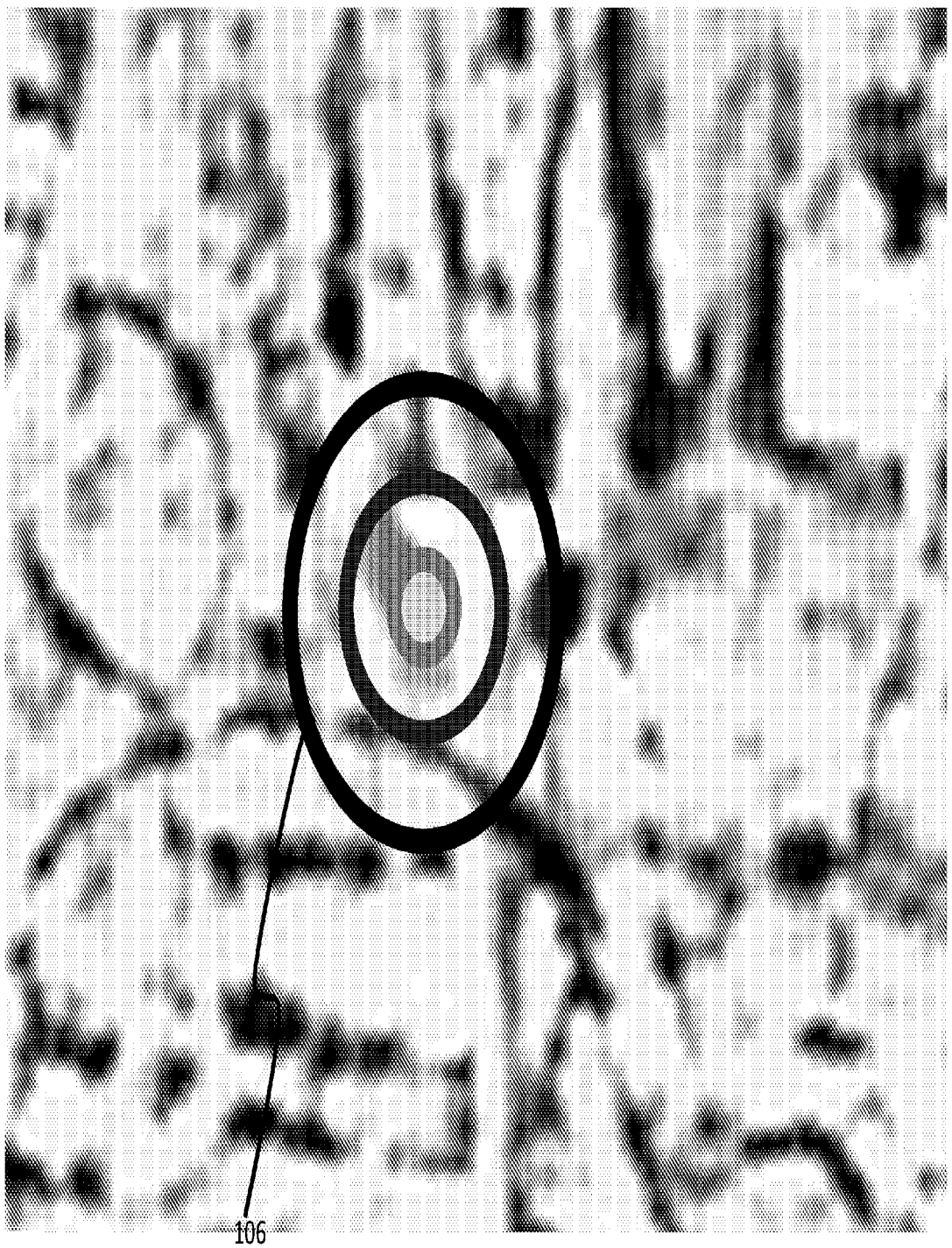
FIG. 10 illustrate the example in which an aiming reticle changes to indicate when the user is aiming at a target area that is hot.

FIGS. 9 and 10 illustrate another example in which an aiming reticle 104 changes to indicate when the user is aiming at a cool or ambient target area (FIG. 9) and when the user is aiming at a hot area FIG. 10.

Figure 11:
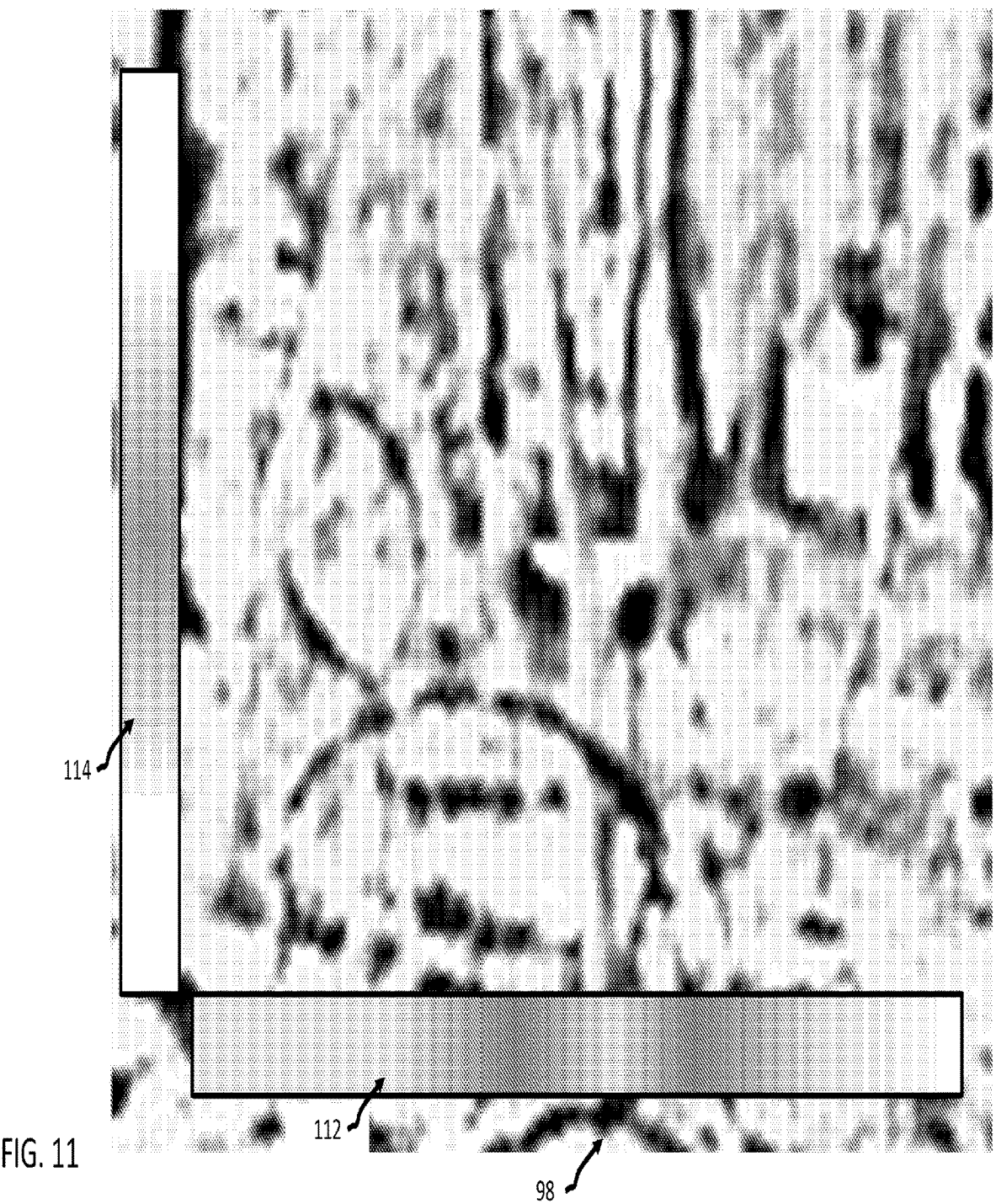
FIG. 11 illustrates another example in which gradients are used to identify hot portions in a field of view.
Figure 12:
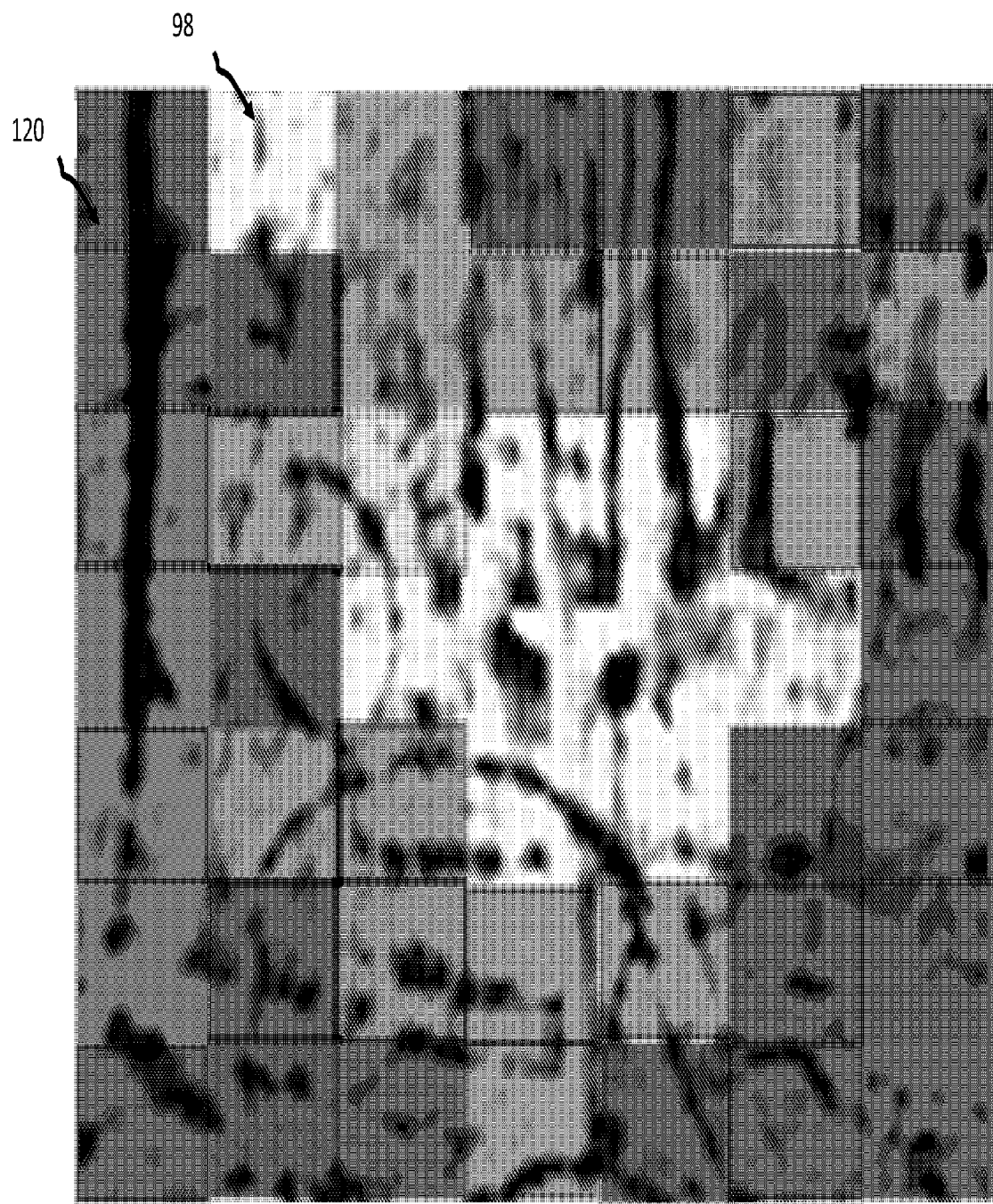
FIG. 12 illustrates another embodiment where a field of view is divided into a plurality of different segments and a heat indication is provided for each segment.

FIG. 11 illustrates yet another scene image in which gradients 110 and 112 are used to identify hot portions in the scene and FIG. 12 illustrates another embodiment where the scene is divided into a plurality of different segments 120 and a heat indication is provided for each segment. Here the heat indication is shown in the form a pattern of lighter and darker areas with lighter areas being indicative of more heat.

It will be appreciated that these a user will always be able to observe the field of view using visible light without delays or lost scene information through resolution differences, color interpretations, the smaller dynamic range of electronic imagers and displays, processing errors and the like.

As is clear from FIGS. 7-8, and 11 &12 alignment between images formed by the image modulated illuminating light the observable field of view observable through window 30 is provided such that such images are viewed generally in registration with the field of view. This can be accomplished using mechanical alignment schemes as well as digital alignment schemes where alignment is performed without necessary mechanically adjustments such as by adjusting or shifting the presentation of images within a range of possible presentation positions made available by light valve 60 or by capturing an image field that extends beyond the field of view and cropping the captured image to provide an image that corresponds to the field of view aligned with the image. Similarly as is illustrated in FIGS. 9 and 10 a reticle 102 may be provided and alignment of the field of view may be provided by way of mechanical or electronic alignment with location reticle being adjustable by adjusting the reticle to be within one of a range of positions within light valve 60.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

The invention has been described in detail with particular reference to certain preferred embodiments thereof, but it will be understood that variations and modifications can be effected within the spirit and scope of the invention.

What is claimed is:

1. A display comprising:
   a base adapted for mounting to a firearm;
   a window supported by the base; and
   an assembly configured to:
      generate an image;
      receive information from remote sources;
      based at least in part on the image and the information, generate an illumination beam; and
      direct the illumination beam to the window,
      wherein the window reflects at least a portion of the illumination beam such that the image and at least a portion of the information is presented via the window with objects in a field of view.

2. The display of claim 1, wherein the assembly is further configured to:
   modulate the illumination beam based at least in part on the image to provide a modulated illumination beam; and
   substantially collimate the modulated illumination beam to provide a collimated beam.

3. The display of claim 2, wherein the assembly further comprises a turning mirror that directs the modulated illumination beam to a collimating optic.

4. The display of claim 2, wherein the window has an anti-reflective coating disposed on a surface onto which the modulated illumination beam impinges, wherein residual reflection generated by the anti-reflective coating reflects the at least a portion of the collimated beam such that the image is presented via the window.

5. The display of claim 4, further comprising a power source positioned to a side of the firearm.

6. The display of claim 2, wherein the assembly comprises:
   an illuminator operable to generate the illumination beam;
   a light valve configured to modulate the illumination beam based at least in part on the image to provide the modulated illumination beam; and
   a collimating optic in an optical path between the light valve and the window that substantially collimates the modulated illumination beam to provide the collimated beam.

7. The display of claim 6, wherein the assembly further comprises a turning mirror disposed in an optical path between the light valve and the window.

8. The display of claim 7, wherein:
   at least one of (i) the illuminator and (ii) the light valve is arranged at least in part to a side of the firearm; and
   the turning mirror is configured to reflect light from the at least one of the illuminator and the light valve onto the window.

9. The display of claim 1, wherein the assembly further comprises an image source and an image generator, the image source adapted to provide images to the image generator that generates the image, the images changing over time.

10. The display of claim 1, wherein the information comprises one or more of targeting information, strategic information, tactical information, health information, safety information, instructions, or image information.

11. The display of claim 10, wherein:
    the information comprises at least image information; and
    the assembly comprises an image generator configured to generate an image based at least in part on the image information.

12. A method comprising:
    providing a base adapted for mounting to a firearm;
    providing a window to be supported by the base; and
    providing an assembly configured to:
       generate an image;
       receive information from remote sources;
       based at least in part on the image and the information, generate an illumination beam; and
       direct the illumination beam to the window,
       wherein the window reflects at least a portion of the illumination beam such that the image and at least a portion of the information is presented via the window with objects in a field of view.

13. The method of claim 12, further comprising:
    mounting the base to the firearm.

14. The method of claim 12, wherein the assembly is further configured to:
    modulate the illumination beam based at least in part on the image to provide a modulated illumination beam; and
    substantially collimate the modulated illumination beam to provide a collimated beam.

15. The method of claim 14, wherein the assembly comprises:
    an illuminator operable to generate the illumination beam;
    a light valve configured to modulate the illumination beam based at least in part on the image to provide the modulated illumination beam; and
    a collimating optic in an optical path between the light valve and the window that substantially collimates the modulated illumination beam to provide the collimated beam.

16. A display comprising:
    a base adapted for mounting to a firearm;
    a window supported by the base through which a user may view a field of view; and
    an assembly configured to:
       generate an illumination beam;
       capture an image of the field of view to provide a captured image of the field of view;
       receive information from remote sources;
       modulate the illumination beam based at least in part on the captured image of the field of view and the information to provide a modulated illumination beam; and
       collimate the modulated illumination beam to provide a collimated beam,
       wherein the window reflects at least a portion of the collimated beam such that the image and at least a portion of the information is presented via the window with objects in the field of view.

17. The display of claim 16, wherein the assembly comprises:
- an illuminator operable to generate the illumination beam;
- an image source comprising an imager that captures the image of the field of view;
- a light valve configured to modulate the illumination beam based at least in part on the captured image of the field of view to provide the modulated illumination beam; and
- a collimating optic in an optical path between the light valve and the window that substantially collimates the modulated illumination beam to provide the collimated beam.

18. The display of claim 17, wherein:
- the imager is configured to sense infrared light;
- the image source is configured to provide an image including an aiming reticle; and
- based at least in part on the infrared light sensed, the aiming reticle is configured to change to indicate (i) when the user is aiming at a cooler area in the field of view and (ii) when the user is aiming at a hotter area in the field of view.

19. The display of claim 18, wherein the image source is configured to (i) divide the field of view into a plurality of different segments and (ii) provide the image with a separate heat indication for each segment based at least in part on the infrared light sensed in each segment.

20. The display of claim 16, wherein the information comprises one or more of targeting information, strategic information, tactical information, health information, safety information, instructions, or image information.

\* \* \* \* \*